United States Patent [19]

Sawada et al.

[11] 3,710,359

[45] Jan. 9, 1973

[54] WORK SAMPLER FOR MAGNETICALLY RECORDING INFORMATION IN TIME-COORDINATED BITS

[75] Inventors: Hideo Sawada; Ensei Rin, both of Kanagawa-ken; Isao Yamada; Hiroshi Mano, both of Tokyo, all of Japan; Thomas K. McGourty, Aptos, Calif.

[73] Assignee: Kabushiki Kaisha Ricoh, Tokyo, Japan

[22] Filed: Jan. 15, 1971

[21] Appl. No.: 106,708

[30] Foreign Application Priority Data

Jan. 20, 1970 Japan ....................45/5581

[52] U.S. Cl...............340/174.1 G, 346/20, 346/138

[51] Int. Cl........G11b 5/52, G11b 5/74, G11b 15/20

[58] Field of Search...............340/174.1 A, 174.1 G; 346/74 MD, 74 M, 138, 20, 80, 93; 307/110

[56] References Cited

UNITED STATES PATENTS

| | | | |
|---|---|---|---|
| 2,888,311 | 5/1959 | Gaebler | 346/20 |
| 3,094,700 | 6/1963 | Berch et al. | 340/174.1 G |
| 3,104,928 | 9/1963 | Hester | 346/20 |
| 3,191,181 | 6/1965 | Moyano | 346/80 |
| 583,953 | 6/1897 | Telsa | 307/110 |
| 3,277,244 | 10/1966 | Frost | 340/174.1 G |
| 2,447,803 | 8/1948 | Hobby | 346/80 |

*Primary Examiner*—Howard W. Britton
*Assistant Examiner*—Jay P. Lucas
*Attorney*—John J. McGlew and Alfred E. Page

[57] ABSTRACT

A rotatably mounted drum driven by a clock mechanism mounts a magnetic recording sheet. A magnetic head is cooperable with the recording sheet and is arranged for connection to a magnetic recording circuit which includes a switch controlling energization of the circuit in accordance with changes in a physical state to be recorded. The clock mechanism effects relative movement of the magnetic head and the sheet in chronological sequence and includes means operable to connect the recording circuit to the magnetic head once during each unit time interval to record information magnetically on the sheet during unit time intervals in which the circuit is energized by its control switch. The drum is rotatably mounted on a cylinder containing a dry cell serving as a source of potential for the recording circuit and for winding means of the clock mechanism. The information recorded on the recording sheet may be made available through a magnetic pickup head or through printout means.

10 Claims, 29 Drawing Figures

3,710,359

PATENTED JAN 9 1973

3,710,359

SHEET 03 OF 11

WORK SAMPLER FOR MAGNETICALLY RECORDING INFORMATION IN TIME-COORDINATED BITS

BACKGROUND OF THE INVENTION

It is frequently desirable, for business administration purposes, to obtain data as to the efficiency or work habits of workers, particularly typists who may be working under pressure during the working day. It also is frequently desirable to determine the effectiveness of a business machine, such as a computer, a copying machine, or the like, by measuring the time during which a particular machine is actually used during business hours. Additionally, it may be desired to learn the degree to which facilities, in a specific position or installation, are utilized.

It is also frequently desirable to retrieve other information, such as a change in a physical state or a change in the condition in which a typist, for example, is working while seated, so that information may be made available as to the total time during which a typist, for example, is seated at her desk during business hours. However, there has not hitherto been developed, much less produced on a commercial scale, a suitable recording device which is compact in size, practical, and convenient to use, and which is capable of recording the above-mentioned information.

SUMMARY OF THE INVENTION

This invention relates to a work sampling system and, more particularly, to a novel and improved work sampler capable of detecting a change which divides a physical state into two sets of conditions, and which is effective to detect, on which of the two sets, an existing condition occurs and to record the detected information during a unit time interval.

In a work sampling system embodying the invention, when a change in a physical state is detected, the detected information is supplied to a switch which is actuated to convert the information into a binary logic signal supplied to a magnetic recording device arranged to be actuated, for each unit time interval, for recording on a magnetic recording sheet. The recorded information is read out by means of an information reproducing device and converted into a record that can be used immediately. As the recorded information is expressed as a binary logic signal, such information can be readily applied as an input to a computer.

Any physical phenomenon, such as sound, light, heat, pressure, humidity, vibration, or the like, can constitute a subject to be recorded by a work sampler embodying the invention. One of the important features of the invention resides in the fact that, since the work sampler records only "yes" or "no" with respect to a proposition, the information obtained by the sampler can be analyzed with great ease. The simplest form of physical state which can constitute a subject to be recorded by a work sampler embodying the invention is the presence or absence of an object. Such condition can readily be converted into an information bit by closing a switch when the object is present and by opening the switch when the object is not present. Even if the present invention is limited to this particular case, the work sampler still has a wide range of applications, such as the following:

I. Utilization of the Work Sampler by Management Consultants

1. Measuring the period of time during which a particular individual, a chain, or a door, in a key position works;

2. Checking on the flow of parts or the operation of machines at a given standard; and 3. Measuring the degree to which a place, facilities, machine, or instrument, is utilized.

The use of the work sampler for the above-mentioned operations makes it possible to rationalize the arrangement of personnel, machines, instruments, or facilities, and to effect changes in their arrangement rationally, thereby permitting evaluation of the working efficiency of a particular individual.

II. Utilization of the Work Sampler by Office Managers

1. Measuring the degree to which typists, for example, are pressed with work during business hours, making it possible to obtain data on the management of the work volume; and 2. Detecting the period of time during which a copying machine, computer, or other business machine is used during business hours, permitting the obtaining of information on how to use such a machine most efficiently.

As mentioned, any physical phenomenon, such as light, heat, pressure, humidity, vibration, or the like, can constitute a subject to be recorded by the invention work sampler. In accordance with the invention, a change in any physical phenomenon, of the kind described, can be detected by a detector which suits the particular physical condition under observation, and the detected information is applied to a switch to be converted into a binary logic signal. When the physical phenomenon constituting the subject to be recorded is light, for example, a photoelectric transducer element may be used as a detector, and a bimetal element may be used as a detector when the subject to be recorded is heat. When the subject is humidity, a hygrometer, which can provide a mechanical motion, may be used as a detector. By recording changes in these physical phenomenons by the work sampler embodying the invention, it is possible to keep records, in chronological sequence, of room temperature, humidity, noise, illumination and the like, in hospitals, sanitoriums, factories and the like, so as to obtain data and determine whether the recorded values are in accordance with predetermined standards. Thus, the use of the work sampler of the invention in this manner contributes to improving public health by bettering physical environments.

As also mentioned, a work sampler embodying the invention has utility in recording information regarding any physical phenomenon to which a person is subjected, and offers many advantages which have not hitherto been obtainable. An additional advantage of the invention work sampler lies in the fact that no limits are set thereto with respect to the position in which it is used, because it is simple in construction and compact in size.

An object of the invention is to provide an improved work sampler for magnetically recording information.

Another object of the invention is to provide such a work sampler which is self-contained and which records the information in the form of binary logic signals which can be used as the input for a computer.

A further object of the invention is to provide such a work sampler in which the information is recorded in chronological sequence for each individual unit time interval.

Another object of the invention is to provide such a work sampler which is compact in size, inexpensive to construct, efficient in operation, and readily portable.

For an understanding of the principles of the invention, reference is made to the following description of typical embodiments thereof as illustrated in the accompanying drawing.

DESCRIPTION OF THE PREFERRED EMBODIMENTS

Figure 1:
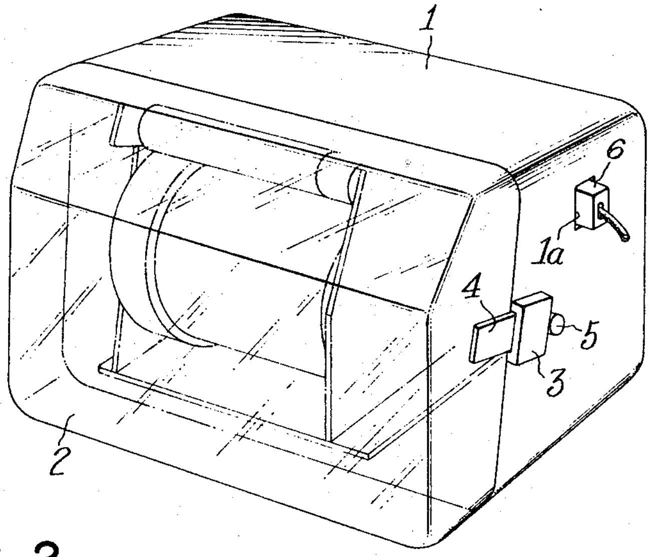
FIG. 1 is a perspective view of one form of work sampler embodying the invention.

Referring to FIG. 1, a word sampler embodying the invention includes a casing 1 for housing its inner mechanisms, as shown in FIGS. 2 through 5, and a cover 2 of transparent synthetic resin or the like and provided on the front of casing 1. Cover 2 is secured to casing 1 by insertion of latching members 4, on opposite ends of cover 2, in receiving members 3, on opposite ends of casing 1, and cover 2 can be removed from casing 1 by depressing release buttons 5.

Figure 2:
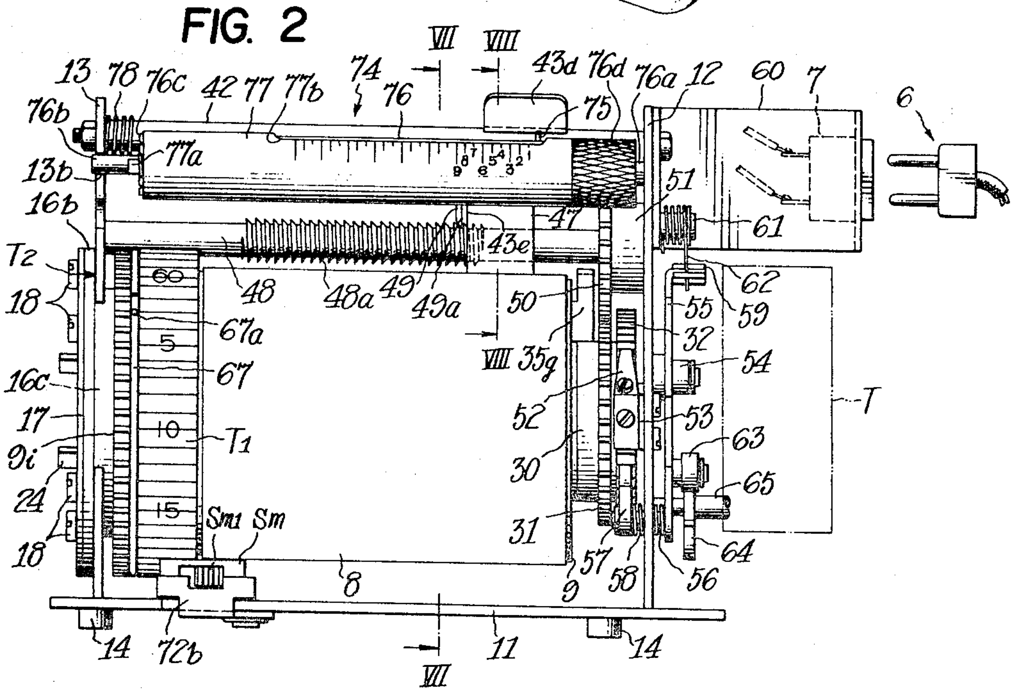
FIG. 2 is a front elevation view of the work sampler shown in FIG. 1, illustrating its inner mechanisms.
Figure 24:
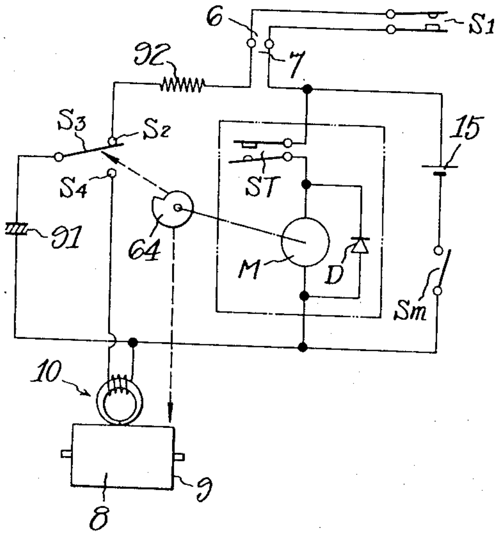
FIG. 24 is a schematic wiring diagram of a magnetic recording circuit.

An opening 1*a* is formed in a right side wall of casing 1, as viewed in FIG. 1, to receive a plug 6 inserted into a socket 7, shown in FIG. 2, which is connected, for example, to a magnetic recording circuit, as shown in FIG. 24.

A switch S1 (FIG. 24), adapted to be closed or opened by a detector which may vary depending on the subject to be recorded, is connected to plug 6. The detector may be of any suitable form in dependence on the subject to be recorded, and a description of the specific details of each type of detector is believed unnecessary. When the subject to be recorded is the presence or absence of an object, switch S1 itself may serve as a detector which may, for example, be placed on a chair.

FIGS. 2 through 7 illustrate the inner mechanism of the work sampler embodying the invention. The principal part of the work sampler is constituted by a magnetic recording device comprising a magnetic recording circuit controlled by a switch, such as a switch S1 operated by the detector, and means controlled by a clock device for effecting relative shifting of a magnetic head and a magnetic recording sheet with time or chronologically, and rendering the magnetic recording circuit operative for each unit time interval, so as to record, on the magnetic sheet, information obtained responsive to operation of the switch associated with the detector. In the particular embodiment illustrated, a magnetic recording sheet 8 (FIG. 8) is adapted to be wrapped around a magnetic sheet mounting drum 9 which is controlled by the clock device T (FIG. 2) to rotate in chronological sequence.

Correspondingly, magnetic head 10 (FIG. 7) is also controlled by clock device T to be shifted, in chronological sequence, axially of drum 9 along magnetic sheet 8 wrapped therearound. The construction of clock device T will be described hereinafter.

Figure 6:
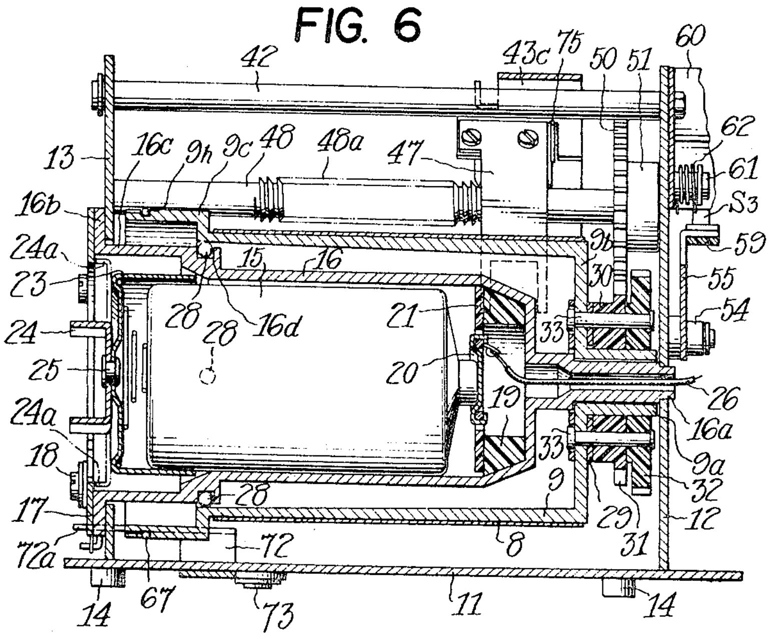
FIG. 6 is a sectional view taken along the line VI—VI of FIG. 4.

Referring to FIG. 2, side walls 12 and 13, for supporting the inner mechanism, are mounted on a baseplate 11 having four feet 14 on its under surface and secured by suitable means to the bottom plate or base of casing 1. A cylinder 16 is supported between side walls 12 and 13 to contain a dry cell 15, such as a commercially available dry cell, as shown in FIG. 6. A minor diameter shaft portion 16*a* integral with one end of cylinder 16 extends through an opening substantially in the central portion of side wall 12, and a radially outwardly extending flange 16*b* is formed at the other end of cylinder 16. An electrically conducting retaining ring 17 is mounted on flange 16*b*, and ring 17 and flange 16*b* are secured to side wall 13 by screws 18, as shown in FIG. 4.

Referring again to FIG. 6, an electrically insulating or dielectric ring 19 is secured to the inner surface of a shoulder of cylinder 16, and a dielectric support plate 21, secured to ring 19, supports an electric terminal 20. Dry cell 15 is mounted in cylinder 16 with its positive pole or terminal positioned against terminal 20. An electrically conducting pan-shaped retaining member 23, provided with an electrically conductive spring 22, is inserted through stop ring 17 and positioned in embracing relation with the rear end of dry cell 15 and with spring 22 engaging the other terminal or base of dry cell 15. A metallic retaining member 24, having a length slightly greater than the inner diameter of ring 17, is secured by a rivet 25 to retaining member 23, and has its ends bent outwardly to form lock portions 24*a*.

Figures 3, 4, 11:
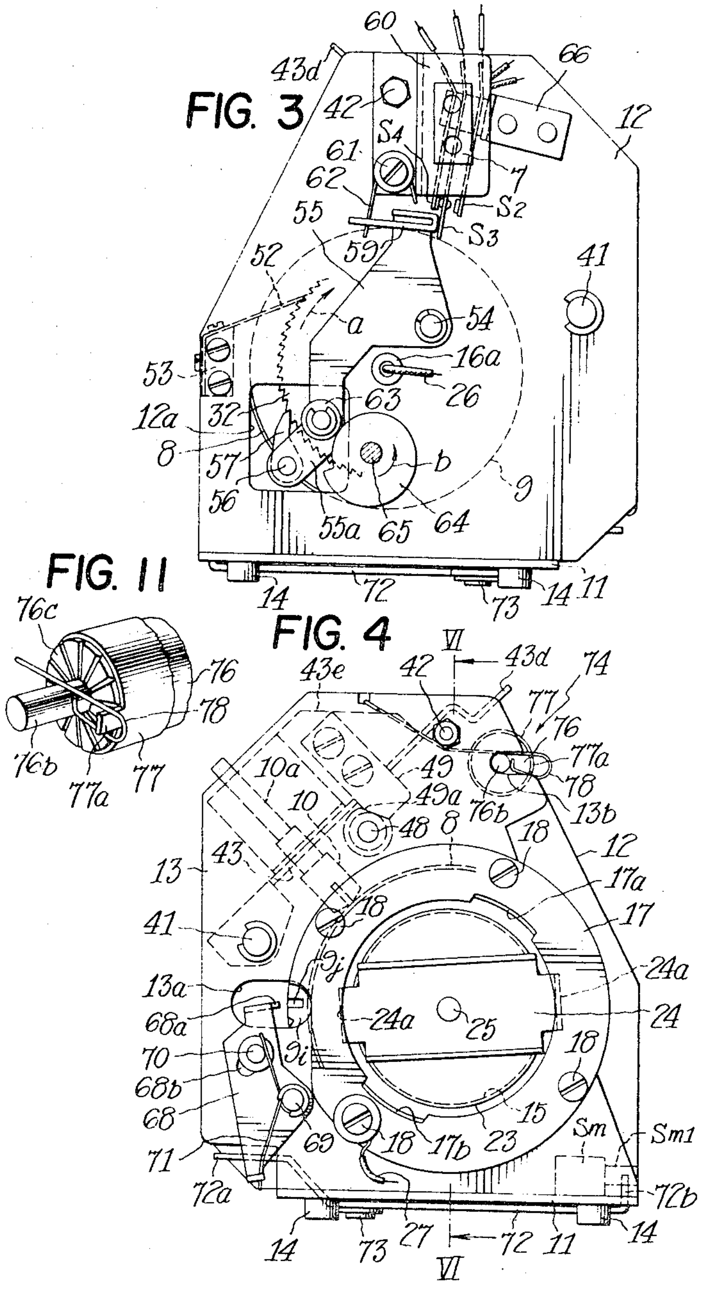
FIG. 3 is a right side elevation view of the work sampler shown in FIG. 2.
FIG. 4 is a left side elevation view of the work sampler shown in FIG. 2.
FIG. 11 is a partial perspective view of a time indicator, illustrating one end portion thereof.

Correspondingly, stop ring 17 is formed with cut-outs or recesses 17*a* and 17*b*, as shown in FIG. 4, and which are deep enough to permit lug portions 24*a* to extend therethrough. If stop member 24 is rotated slightly after being force-fitted through cut-outs 17*a* and 17*b* into retaining ring 17, then dry cell 15 and retaining member 23 are fixed in place. Since lock portions 24*a* are formed by bending opposite ends of retaining member 24, member 24 and member 23 bear against spring 22 (FIG. 6) at all times, so that dry cell 15 is positively retained in position and maintained in a good electrically conducting state.

A conductor 26 (FIG. 6) has one end connected to the magnetic recording circuit and its other end connected to terminal 20 after extending through the minor diameter shaft portion 16*a* of cylinder 16. Another conductor 27 (FIG. 4) is connected to one of the screws 18 securing the ring 17 to side wall 15.

Cylinder 16, which receives dry cell 15, also serves as a support shaft for drum 9 for mounting magnetic recording sheet 8. In more detail, cylinder 16 has a major diameter portion 16*c* formed with a plurality of holes or recesses 16*d* each receiving a respective ball 28 having a diameter greater than the depth of the groove in which the recesses are formed. Drum 9, which is formed of non-magnetic material, is rotatable fitted over cylinder 16 with its inner circumferential surface adjacent one end engaging balls 28. A tubular shaft portion 9*a* of reduced diameter, formed at the other end of drum 9 , loosely fits over minor diameter shaft portion 16a of cylinder 16. Thus, drum 9 is rotatably supported by cylinder 16.

It should be understood that dry cell 15 need not be positioned in cylinder 16, and may be mounted in any suitable position. However, if dry cell 15 is positioned in cylinder 16, which also rotatably supports drum 9, then it is possible to obtain a compact overall size for the mechanism as a whole. Additionally, it is possible to support drum 9 in a very stable manner through the medium of using a relatively large diameter cylinder 16.

As shown in FIG. 6, a magnetic sheet retaining plate 29, dielectric separating ring 30, a gear 31 and a ratchet wheel 32, described hereinafter, are mounted, in the indicated order, on shaft portion 9*a* of drum 9. These components are secured to an end surface 9*b* of drum 9, adjacent side wall 12, by headed rivets 33 so as to constitute a unit.

Figure 12:
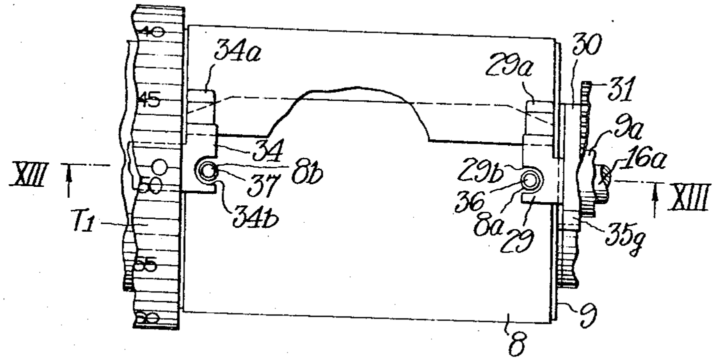
FIG. 12 is a plan view of a magnetic sheet mounting drum.

Magnetic sheet 8 is mounted on drum 9 in a manner which will now be described. As illustrated in FIG. 6, drum 9 is formed with a larger diameter portion 9*c* at its end adjacent side wall 13. As more particularly apparent in FIG. 13, drum portion 9*c* is formed, at its inner end, with an opening 9*d* through which a magnetic sheet retaining plate 34 is inserted into the interior of portion 9*c* and secured, at its base, to the inner surface of portion 9*c* by a rivet 34*b*. Retaining plate 34 is intended to hold one side portion of sheet 8, as shown in FIG. 12, and a retaining pawl or finger 34*a* is arranged to have its free end press against the outer circumferential surface of drum 9 and it has its base secured to or integral with, plate 34.

Figures 13, 14, 15:
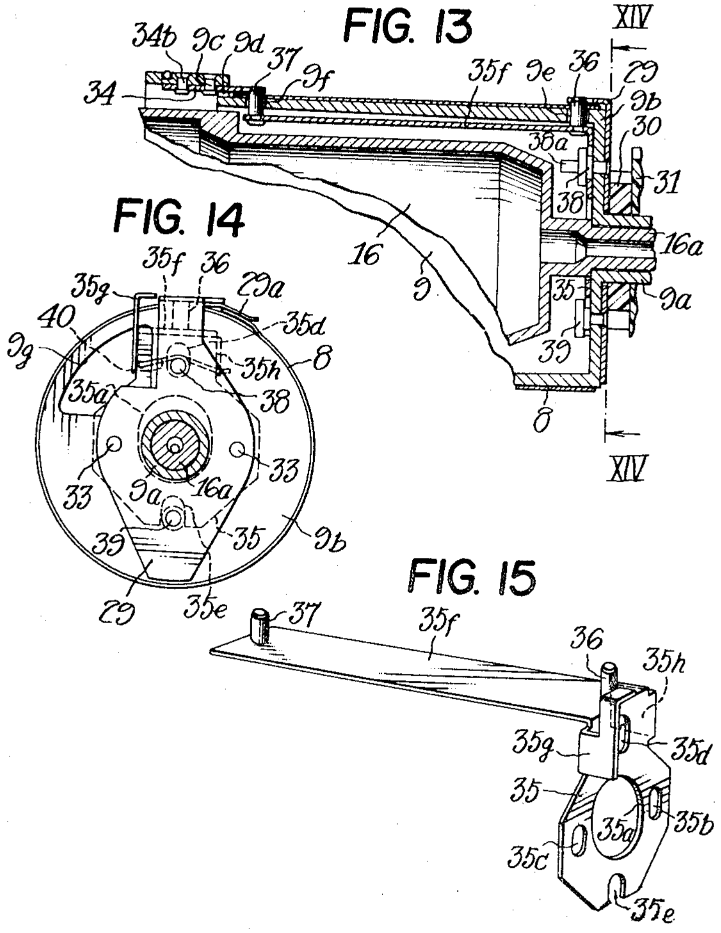
FIG. 13 is a sectional view taken along the line XIII—XIII of FIG. 12.
FIG. 14 is a sectional view taken along the line XIV—XIV of FIG. 13.
FIG. 15 is a perspective view illustrating magnetic sheet positioning means.

The other retaining plate 29 has a radially outer end portion bent toward drum 9, as shown in FIG. 14, to hold down the other side portion of sheet 8, so that plates 29 and 34 cooperate to hold opposite side portions of sheet 8 on drum 9. A hold-down pawl or finger 29*a*, similar to finger 34*a*, extends from one end of the bent portion of plate 29. The bent portions of plates 29 and 34 are formed with respective cut-outs or recesses 29*b* and 34*b* which open toward each other, as shown in FIG. 12, and drum 9 is formed with respective small openings 9*e* and 9*f* (FIG. 13) in alignment with cut-outs 29*b* and 34*b*. Positioning pins 36 and 37 of magnetic sheet positioning means 35 (FIG. 15), which is disposed in the interior drum 9, extend through openings 9*e* and 9*f*, respectively.

Referring to FIGS. 13, 14 and 15, sheet positioning means 35 is formed with an essentially oval slot 35*a* loosely embracing an offset portion of shaft portion 16*a* of cylinder 16. Means or component 35 is also formed with oval slots 35*b* and 35*c* on opposite sides of slot 35*a*, and with an oval slot 35*d* and a cut-out 35*e* disposed, respectively, above and below slot 35*a*. Positioning means 35 is mounted, for up or downward movement, and as illustrated in FIG. 13, by loosely fitting slots 35*e* and 35*c* over headed rivets 33, and loosely fitting slot 35*d* and cut-out 35*e* over headed rivets 38 and 39, respectively, these rivets being secured to retaining plate 29 through the end wall of drum 9. Plate 39 serves to reinforce the end wall of drum 9 in securing rivets 38 and and 39 to the drum.

Pins 36 and 37 are secured to opposite ends of an elongated arm 35*f* of positioning means 35, and which arm extends axially of drum 9. Furthermore, positioning means 35 is provided, at one side of slot 35*d*, with a push-in portion 35*g* (FIG. 15) which is formed by bending the material of means 35. Portion 35*g* extends through a relatively large segmental aperture 9*g* (FIG. 14) in the end surface 9*d* of drum 9, to project outwardly of this end surface.

An engaging portion 35*h* of positioning means 35 is disposed on the opposite side of slot 35*d*. A torsion spring 40, mounted on a projecting portion 38*a* of pin 38 (FIG. 13), has one end connected to engaging portion 35*h* and has its other end bearing against a portion of positioning means 35. With this arrangement, means 35 is biased in a direction to engage its arm **35*f* with the inner surface of drum 9**.

Figure 16:
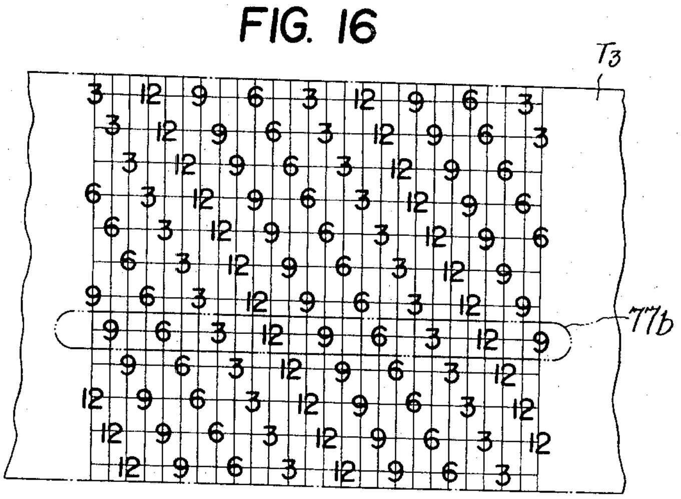
FIG. 16 is a developed view of a time table inscribed on the circumferential surface of a spindle of a time indicator.

FIG. 16 illustrates magnetic sheet 8 having information recorded thereon, and this sheet is of the same size as a U.S. one dollar note and measures 148 × 65 millimeters. Sheet 8 is formed, on opposite sides of its forward end portion, with small openings **8*a* and 8*b* (FIG. 18) corresponding, in position, to pins 36 and 37 of positioning means 35. The manner of mounting sheet 8 on drum 9**, for the recording of information thereon, will now be described.

If portion **35*g* of means 35 is pushed inwardly, as shown in FIG. 14, against the biasing spring 40, positioning means 35 moves downwardly and pins 36 and 37 are retracted from the outer circumferential surface of drum 9, thereby permitting insertion of a magnetic sheet 8 between retaining plates 29 and 34 and the outer circumferential surface of drum 9. When the forward end of sheet 8 is fully inserted in this manner, openings 8*a* and 8*b* therein are aligned with openings 9*e* and 9*f*, respectively, so that, if the pressure on portion 35*g* is released, spring 40 biases positioning means 35 outwardly to engage pins 36 and 37 in the holes in sheet 8 so that sheet 8** has its forward end secured in the correct position.

If drum 9 is now rotated, with sheet 8 being held in position by hand after it is secured at its forward end to drum, sheet 8 is wound around drum 9 with the rear end of sheet 8 being inserted beneath fingers **29*a* and 34*a* in overlapping relation with the forward end of sheet 8, so that sheet 8 is fully mounted on drum 9**.

The opposite corners of the forward end of sheet 8 are cut-off to form bevels, which greatly facilitate the operation of inserting the rear end of this sheet between fingers **29*a* and 34*a* and the forward end of sheet 8. While the manner of mounting sheet 8 on drum 9 has been described above, it will be understood that the present invention is not limited to the specific manner of mounting as described, and that sheet 8 may be mounted or wrapped around drum 9** in any other suitable manner.

Figure 5:
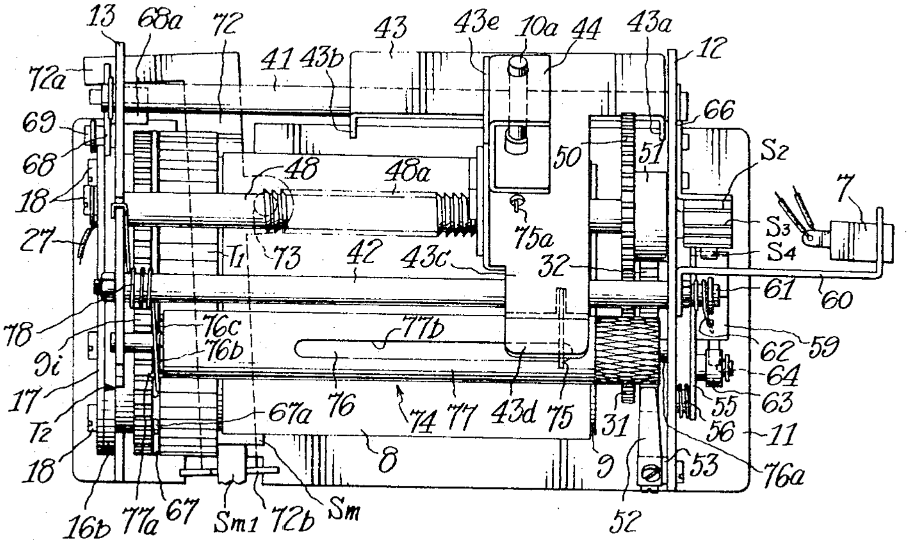
FIG. 5 is a plan view of the work sampler shown in FIG. 2.
Figures 7, 8, 9, 10:
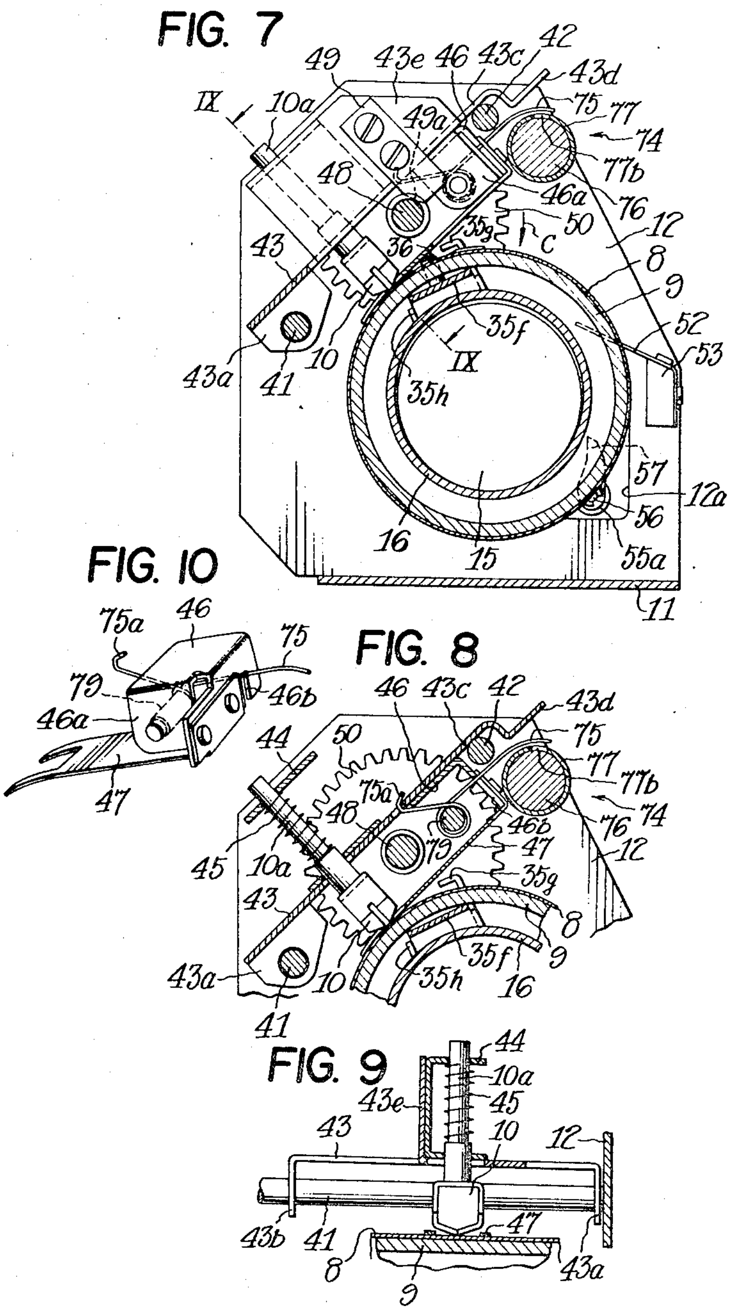
FIG. 7 is a sectional view taken along the line VII—VII of FIG. 2.
FIG. 8 is a sectional view taken along the line VIII—VIII of FIG. 2.
FIG. 9 is a sectional view taken along the line IX—IX of FIG. 7.
FIG. 10 is a perspective view of a magnetic sheet pressing plate and time pointer support means.

A typical, but not limiting, means for supporting magnetic head 10 is shown, solely for the purposes of illustrating such a support, in FIGS. 4, 5 and 7. Referring to FIG. 7, a support shaft 41 is positioned to the left of drum 9, and a guide shaft 42 is positioned above drum 9, these two shafts having their opposite ends secured in the side walls 12 and 13, as shown in FIG. 5. Flanges **43*a* and 43*b* of a head support means 43 are loosely fitted over shaft 41, as shown in FIGS. 7 and 9, and head support means 43 has a free end portion 43c bearing against shaft 42 and including a bent forward or outer end portion forming a finger rest 43*d*. Support means 43 also has a bent upright portion 43*e* to which is secured the base of a channel 44, and a support rod 10*a* for head 10 is loosely received in openings formed in the flanges of channel 44. A spring 45 embraces a minor diameter portion of rod 10*a* and has one end engaging a shoulder of this rod and its other end engaging the upper flange of channel 44. A time pointer support means 46, shown in FIG. 10, is secured to the underside of support means 43 adjacent the free end of the latter, and a relatively weak resilient magnetic sheet pressing plate 47 has its base secured to support means 46 and extends outwardly therefrom. This pressing plate 47 has a forked portion at its free end arranged to be juxtaposed to the gap of magnetic head 10. Support means 46 rests against shaft 42 due to its own weight, so that the gap of magnetic head 10 and the forked portion of plate 47 bear, with a suitable pressure, against a magnetic sheet 8 wound on drum 9**.

As shown in FIG. 7, there is a threaded shaft 48 interposed between the central portion of support means 43 and drum 9, and shaft 48 has its opposite ends rotatably supported in side walls 12 and 13, as shown in FIG. 6. A threaded portion **48*a* of shaft 48 (FIG. 2) meshes with a tooth-shaped portion 49*a* of an engaging member 49 secured to one surface of the bent upright portion 43*e* of support means 43, and disposed above shaft 48**.

A gear 50, having the same diameter as gear 31 secured to drum 9, and a separating ring 51, which may be a hub of gear 50, are secured to that portion of shaft 48 adjacent side wall 12. Gear 50 meshes with gear 31 which, as mentioned, is integral or forms a unit with ratchet wheel 32, and a pawl 52 engages ratchet wheel 32 so that ratchet wheel 32 can be rotated only in the direction of the arrow *a* in FIG. 3. Pawl 52 is secured to a support 53 mounted on side wall 12, as illustrated in FIG. 2 and 3.

As best seen in FIG. 3, a lever support or pivot shaft or pin 54 is secured to the central portion of side wall 12 and pivotally supports a lever 55. Lever 55 has an arm **55*a* carrying a shaft 56 on its forward end portion, and shaft 56 extends through a relatively large opening 12*a* in side wall 12 to extend inwardly of side wall 12, as shown in FIG. 2. A feed pawl is loosely mounted on a forward end portion of shaft 56, and is biased to engage the teeth of ratchet wheel 32 by a spring 58 mounted on shaft 56**.

The other arm **55*b* of lever 55 has a dielectric switch-actuating member 59 secured to its outer end, as shown in FIG. 3. A support plate 60 for socket 7 is secured to the central upper portion of the outer surface of side wall 12 by the head of shaft 42 and a pin or stub shaft 61. Socket 7 is fixedly supported by a projecting support portion of support plate 60, as shown in FIG. 5. A torsion spring 62 embraces pin or shaft 61 and has one end engaging support plate 60 and its other end engaged with switch-actuating member 59. Spring 62 biases lever 55 to pivot clockwise about shaft 54 as viewed in FIG. 3**.

Arm **55*a* of lever 55 rotatably supports a roller 63 which is biased, by lever 55, to bear against the peripheral surface of a cam 64 secured on a shaft 65** connected to clock device T and making one complete revolution, in the direction of the arrow *b*, in each minute. One complete revolution of cam 64 causes lever 55 to make one pivotal movement, in slaved relation, thereby causing feed pawl 57 to advance ratchet wheel 32 in the direction of the arrow *a* a distance corresponding to the spacing between two adjacent teeth. Thus, ratchet wheel 32 is advanced a distance corresponding to the distance between two adjacent teeth once each minute and, as it has 60 teeth, makes one complete revolution in 1 hour.

Also, one pivotal movement of lever 55 causes actuating member 59 to move a movable contact S3, normally maintained in engagement with a fixed contact S4, into engagement with a fixed contact S2, the fixed contacts being mounted in the upper portion of side wall 12, as by being supported, together with movable contact S3, by a dielectric support member 66 secured to the outer surface of side wall 12.

The operation of drum 9 and magnetic head 10 will now be explained with reference to a time indicating mechanism. As ratchet wheel 32 is advanced to the distance of one tooth every minute, drum 9 and gear 31 are rotated in the direction of the arrow *a*, shown in FIG. 3, through the same angular displacement. A time table T1, indicating the time in minutes, as shown in FIG. 2, is provided on the outer circumference of portion 9*c* (FIG. 6) of drum 9, and indicates the elapsing of 60 minutes when drum 9 makes one complete revolution. Portion 9*c* of drum 9 is formed with a peripheral groove 9*h* (FIG. 6) which rotatably receives an annularly incomplete ring 67. One end of ring 67 is bent upright and and directed radially of drum 9 to provide a starting time pointer 67*a* (FIG. 5).

Major diameter portion 9*c* of drum 9, adjacent its outer end near side wall 13, is formed with a click portion 9*i* (FIG. 2) comprising a number of axially extending grooves, with one groove 9*j* (FIG. 4) being deeper than the others to determine a starting position. A locking portion 68*a* of a locking lever 68 pivotally mounted on a shaft 69 secured to a lower portion of the outer surface of side wall 13 is maintained in engagement with click portion 9*i*. The range of pivotal movement of lever 68 is limited by a shaft or pin 70 secured to side wall 13 and extending through a slot 68*b* in lever 68. A spring 71 embraces pin or shaft 69 and has one end connected to shaft 70 and its other end connected to a lower arm of lever 68, to bias lever 68 to pivot clockwise about shaft 69, as viewed in FIG. 4.

An opening 13*a* is formed in side wall 13, and latching portion 68*a*, formed by bending an upper arm of lever 68, extends inwardly through opening 13*a* to engage click portion 9*i* under the bias of spring 71. A latching portion 72*a* in one arm of a lever 72 is positioned against the lower arm of lever 68, as shown in FIG. 4, and lever 72 is pivoted on a shaft 73 secured to the under surface of baseplate 11. The other arm of lever 72 is bent upwardly to form a portion 72*b* maintained in engagement with an actuator S*m*1 of a main switch S*m* (FIG. 2) mounted on baseplate 11. Actuator S*m*1 is shown in a position in which it has closed the switch S*m*, so that lever 72 pulls and moves lever 68 counterclockwise about shaft 69 against the bias of spring 71. Thus, when switch S*m* is closed, latching portion 68*a* of lever 68 is moved away from click portion 9*i* of drum 9.

If switch S*m* is opened, lever 72 pivots clockwise about shaft 73 in slaved relation to actuator Sm1, and this unlocks lever 68 so that latching portion 68*a* is pressed against click portion 9*i*. Magnetic recording sheet 8 is mounted on drum 9 when main switch Sm is opened and, in mounting sheet 8 on drum 9, it is necessary to determine a starting reference position of drum 9 with respect to magnetic head 10. The described click stop mechanism is useful in determining such position.

The grooves of click portion 9*i* correspond to respective lines indicating the minutes on timetable T1. An indicator T2, for indicating a starting position, is inscribed on flange 16*b* of cylinder 16, as shown in FIG. 2. It is possible to set a starting reference position of drum 9 with respect to any minute mark, as desired, by manually rotating drum 9 while bringing pointer T2 into alignment with a particular minute line on timetable T1.

If drum 9 is rotated manually, lever 68 will be brought into engagement with deep groove 9*j* (FIG. 4). At this time, the drum stops rotating and is firmly locked in position. When drum 9 is locked in position in this way, the starting reference position of drum 9 is set at 0 (zero) minute. Since the starting reference position of drum 9 is set at 0 (zero) minutes in many cases, this arrangement makes it possible readily to determine a starting position of magnetic recording sheet 8 with respect to magnetic head 10. When drum 9 is placed in the starting reference position, starting tie pointer 67*a* of ring 67 (FIG. 5) is indexed with indicator T2. With this arrangement, it is possible readily to learn the starting reference time later on, since the starting time indicator 67*a* rotates together with drum 9.

Rotation of gear 31 is transmitted to gear 50 and causes threaded shaft 48 to rotate in a direction of arrow *c* in FIG. 7. Accordingly, engaging member 49 meshing with threaded shaft 48 moves gradually along threaded portion 48*a* of shaft 48, causing magnetic head 10 to move from right to left as viewed in FIG. 5. As the threaded portion 48*a* causes head 10 to be shifted by one thread pitch when shaft 48 makes one complete revolution, the head is shifted by one pitch after each hour is completed, as shaft 48 completes one revolution in 1 hour. The shifting of magnetic head 10 in chronological sequence is indicated by the cooperation of a time indicator 74 and time pointer 75, shown in FIG. 2.

Time indicator 74 is disposed immediately below and to the right of guide shaft 42 for head 10, as shown in FIGS. 4 and 7. The time indicator comprises principally a spindle 76 and an outer cylinder 77 telescoped over spindle 76. Spindle 76 is formed, at its opposite ends, with reduced diameter shaft portions 76*a* and 76*b*, shaft portion 76*a* being loosely received in an opening formed in side wall 12 and shaft portion 76*b* being loosely fitted, from the front, in a cut-out 13*b* (FIG. 4) formed in side wall 13, so the spindle 76 is rotatably supported by side walls 12 and 13.

A click portion 76*c* is provided on an end surface of shaft 76, and comprises a number of grooves extending radially of the axis of reduced diameter shaft portion 76*b*. A projection 77*a* is formed on that end of cylinder 77 adjacent shaft portion 76*b*, and one end of a spring 78 extends around projection 77*a* and engages click portion 76*c*. Spring 78 has a bent portion which is positioned against shaft portion 76*b*, and has a coiled portion embracing guide shaft 42 for magnetic head 10 and formed with a bent outer end engaging an upper end edge of side plate 13. Thus, spring 78 serves not only to permit spindle 76 and cylinder 77 to rotate as a unit but also to click stop spindle 76 when it is rotated singly.

Figure 17:
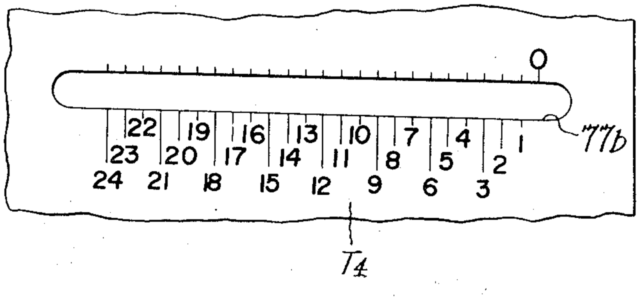
FIG. 17 is a fragmentary developed view illustrating a time table inscribed on an outer cylinder of the time indicator.

As shown in FIG. 16, a timetable T3 is inscribed on the outer circumferential surface of spindle 76, and a time indicating slot 77*b* (FIGS. 5 and 17), having a longer axial dimension, is formed in outer cylinder 77 and renders one row of time indications accessible to the view of an operator. As also shown in FIG. 17, a timetable T4 is inscribed along a side edge of slot 77*b* and comprises a 0 (zero) line which corresponds to a right end time indicating line of timetable T3 as shown in FIG. 16.

The end portion of cylinder 76 adjacent side wall 12 is formed as a knurled portion 76*d* which may be gripped manually to rotate spindle 76. This permits rendering one row of time indications after another, of timetable T3, accessible to the operator's view through slot 77*b* and cylinder 77, while each row of time indications is brought to a correct position by means of the aforementioned click stop mechanism. Timetables T3 and T4 give time readings, with the former showing the time like a clock and the latter showing the elapsed time during a 24 hour period. When recording is started, the starting time on timetable T3 is indexed with the 0 (zero) line on timetable T4 by manually rotating spindle 76.

The resilient time pointer 75 is wound around a shaft 79 mounted on the inner surface of a lateral depending portion 46*a* of time pointer support means 46, as seen in FIG. 10, and has a hooked end 75*a* engaged in an opening formed in support means 43, as best seen in FIG. 8. Time pointer 75 tends to move upwardly in a cut-out 46*b* in a front depending portion of support means 46, so that it may be positioned correctly and extend above indicating portion of indicator 74.

Time pointer 75 is shifted as magnetic head 10 is shifted in chronological sequence, with a reading of the magnitude of its shifting being taken on time indicator 74. A starting position of magnetic head 10 with respect to sheet 8 can be set by indexing time pointer 75 with an indication line on timetable T4. For this purpose, finger rest 43*d* of support means 43 (FIG. 7) is moved upwardly so that engaging member 49 is released from engagement with the threaded portion of shaft 48 whereby support means 43 may be slid along support shaft 41. If support means 43 is slid along shaft 41, and magnetic head 10 is moved until foot 43a abuts side wall 12, the time pointer will be indexed with the 0 (zero) line on timetable T4, as shown in FIG. 5. With this arrangement, magnetic head 10 readily can be placed in a recording starting position with respect to magnetic sheet 8.

Figure 20:
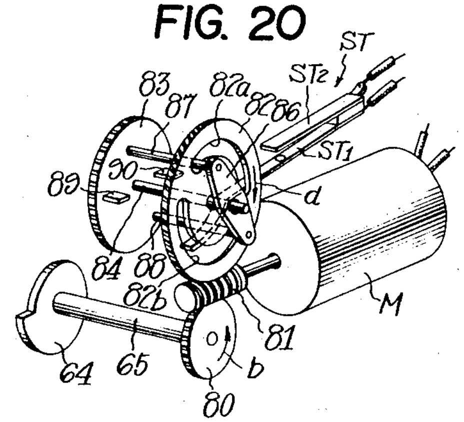
FIG. 20 is a perspective view illustrating a battery-wound clock device.
Figure 21:
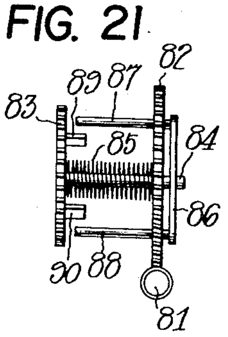
FIG. 21 is a front elevation view of the device shown in FIG. 20.
Figure 22:
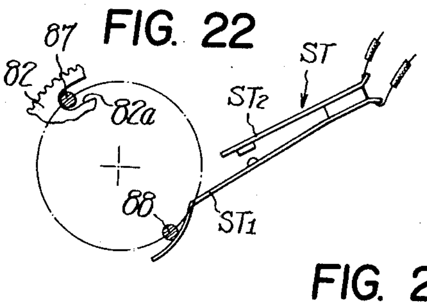
FIG. 22 is a side elevation view of switch means of the clock device.

Clock device T for shifting drum 9 and head 10 in chronological sequence, rotates cam 64 (FIG. 3) one complete revolution each minute. Clock device T may comprise, for example, a battery clock device as shown in FIG. 20 wherein a worm gear 80 secured to shaft 65 of cam 64 meshes with a worm 81 secured to the output shaft of a motor M. Worm 81 also meshes with a spring winding worm gear 82 which is loosely mounted on a shaft 84 also mounting a gear 83. A driving spring 85 embraces shaft 84, as shown in FIG. 21, and has one end connected to worm gear 82 and its other end connected to gear 83. Worm gear 82 is formed with arcuate slots 82a and 82b disposed symmetrically to each other with respect to shaft 84 and extending adjacent the periphery of gear 82. Slots 82*a* and 82*b* loosely receive respective pins 87 and 88 secured to an arm 86 mounted on shaft 84 and these pins are disposed symmetrically to each other with respect to shaft 84. Projections 89 and 90 are formed on the inner surface of gear 83, and are disposed symmetrically to each other with respect to shaft 84 and in positions corresponding to the positions of pins 87 and 88.

Motor M is connected to dry cell 15 through main switch Sm and a switch ST (FIG. 24) which comprises a movable contact ST1 having a forward end portion disposed in the path of revolving movement of pins 87 and 88, as shown in FIG. 20. Movable contact ST1, which normally tends to bear against a fixed contact ST2, is pushed and moved away from fixed contact ST2 by either one of pins 87 or 88 as a pin abuts against the movable contact ST1.

If main switch S*m* (FIG. 2) is closed when switch ST is closed, motor M is energized and rotates worm gear 80 in the direction of arrow *b* causing worm gear 82 to rotate in the direction of arrow *d*. Rotation of worm gear 82 in the direction of arrow *d* charges spring 85 to store potential resilient energy therein. Thereafter, pins 87 and 88 are engaged and moved by the rear ends of slots 82*a* and 82*b*, respectively, in worm gear 82, and pin 88 engages and displaces movable contact ST1 to open switch ST. Opening of switch ST de-energizes motor M, and the resilient potential energy stored in spring 85 is released to cause gear 83 to rotate slowly in the direction of arrow *d* at a rate controlled by the clock device.

Figure 23:
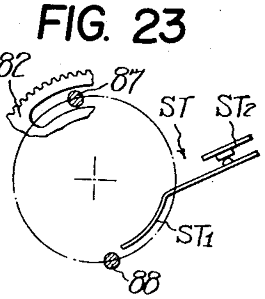
FIG. 23 is a view, similar to FIG. 22, illustrating the switch means as the latter is actuated.

When gear 83 rotates in the direction of arrow *d*, projections 89 and 90 thereon engage and move the respective pins 87 and 88 in the same direction, so that these pins move along the respective slots 82*a* and 82*b* of worm gear 82, while the latter remains stationary. As a result, pin 88 disengages movable contact ST1 so as to re-close switch ST, as shown in FIG. 23. Closing of switch ST energizes motor M again, thereby permitting repetition of the aforementioned cycle continuously. Gear 83 is strictly controlled by a governor to ensure that worm gear 80 completes one revolution in 1 minute.

FIG. 24 illustrates one embodiment of a magnetic recording circuit used to record information on sheet 8 as sheet 8 and head 10 are shifted relatively to each other in chronological sequence. The portion of FIG. 24 enclosed by dash-and-dot lines in the circuit of the battery clock device, and which includes a diode D connected in parallel with motor M, and serving as a protection, the parallel combination of motor M and diode D being connected in series with dry cell 15 through switches S*m* and ST. As the circuit of FIG. 24 has been described above, no further explanation appears to be necessary.

In the circuit shown in FIG. 24, a capacitor 91 is connected in shunt with motor M with respect to dry cell 15 through switch S1, plug 6, receptacle or socket 7, fixed switch contact S2 and movable switch contact S3. Magnetic head 10 is arranged so that, when movable contact S3 is engaged with a fixed contact S4, head 10 is connected in series with capacitor 91.

If main switch Sm is closed and the battery clock device is actuated, cam 64 begins to rotate and pivotal lever 55 (FIG. 3) begins to pivot. Movable contact S3 is disengaged from one of the fixed contacts S2 and S4 and brought into engagement with the other of these two contacts once every minute. When movable contact S3 engages fixed contact S2 while switch S1 is closed, capacitor 91 is charged. When contact S3 is released from contact S2 and brought into engagement with contact S4, capacitor 91 discharges to energize magnetic head 10 to effect magnetic recording of information on magnetic sheet 8. A resistor 92, serving for protection, is connected in series between switch S1 and fixed contact S2.

Figure 25:
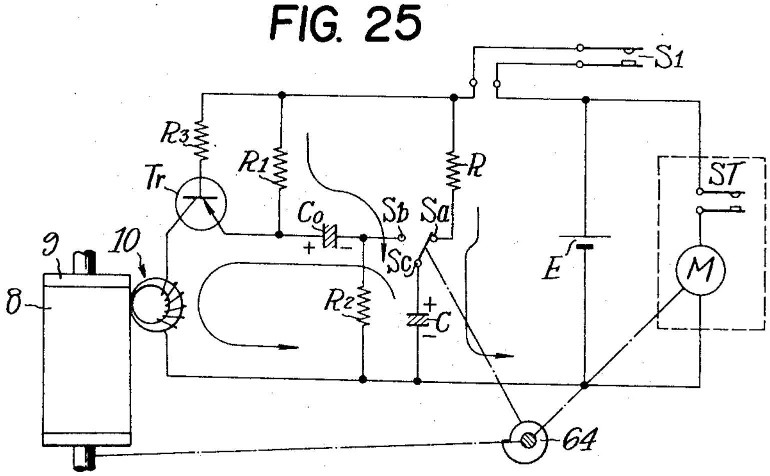
FIG. 25 is a schematic wiring diagram of a modified form of magnetic recording circuit.

If a circuit such as shown schematically in FIG. 25 is used, it is possible to impress, on magnetic head 10, a voltage twice as large as that of the source of potential 15 while still minimizing the consumption of power. Referring to FIG. 25, a capacitor *Co* and a transistor *Tr* are connected between a fixed contact *Sb*, of a change-over switch adapted to be actuated by cam 64, and magnetic head 10 consituting a load, and resistors R1 and R2 are connected to opposite terminals of capacitor Co, so that a series circuit, comprising resistor R1, capacitor *Co* and resistor R2 is connected to opposite terminals of a power source E through switch S1. The junction point of resistor R1 and capacitor *Co* is connected to the emitter of transistor *Tr* which is of the PNP type although a NPN type transistor can be used if power source E is connected in the reverse polarity. A resistor R3 is connected between the base of transistor Tr and one end of resistor R1. Magnetic head 10 is connected between the collector of transistor Tr and the negative terminal of power or potential source E.

If switch S1 is closed while the clock device is in operation, current from source E flows through resistor R and fixed contact *Sa* of the change-over switch so as to charge a capacitor C in a manner such that the terminal of this condenser toward movable contact Sc is positive (+) and the terminal toward the negative terminal of source E is negative (−). Simultaneously, current flows from source E to capacitor *Co* through resistors R1 and R2 so as to charge capacitor *Co* so that the terminal thereof connected to resistor R1 is positive (+) and that toward resistor R2 is negative (−).

On the other hand, no current flows to magnetic head 10 at this time because there is a reverse bias between the base and emitter of transistor *Tr* and the transistor is cut-off. If movable contact Sc of the change-over switch is engaged with fixed contact *Sb* by cam 64 after a predetermined time interval has elapsed, capacitors C and *Co*, which have been charged, are connected in series with each other, and the voltage at the junction point between resistor R1 and capacitor *Co* becomes twice as great as that of source E, or has a value 2E. Accordingly, the potential of the emitter of transistor *Tr* becomes higher by about the value E than the potential in the transistor base, so that base current flows through resistor R3 and transistor *Tr* becomes conductive. Thus, the electric charges of capacitors C and *Co* flow through the emitter and collector of transistor *Tr* to magnetic head 10 to impress thereon a voltage having a value of about 2E. It will therefore be clear that the circuit in FIG. 25 permits impressing on the load a voltage twice as high as that of the source E.

A magnetic recording operation is performed by magnetic head 10 in strict sychronism with chronological shifting of head 10 and recording sheet 8 relative to each other. Recording sheet 8 is shifted as drum 9 makes one-sixtieth revolution each minute, and magnetic head 10 is shifted linearly as threaded shaft 48 makes one complete revolution in 1 hour. Thus, the locus of movement of magnetic head 10 on magnetic sheet 8 mounted on drum 9 is a helical path.

Figure 18:
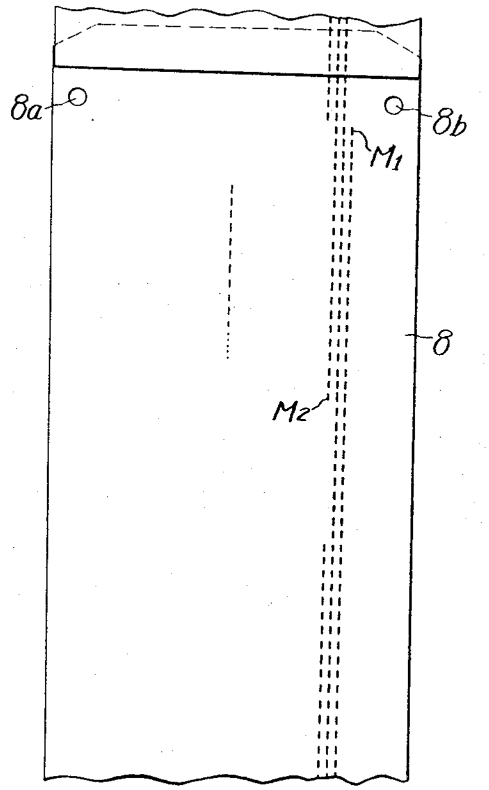
FIG. 18 is a developed view illustrating a magnetic recording sheet on which information has been recorded by the work sampler embodying the invention.

FIG. 18 illustrates information recorded on magnetic sheet 8, and the magnetic marks constituting the helical path of the magnetic head are shown by dashes. Vertical columns of these marks represent the time elapsed in minutes and the horizontal rows thereof represent the time elapsed in hours. This particular magnetic recording sheet 8 contains a record of information on the behavior of a person during his working hours as obtained by placing switch S1 on his chair. Magnetic sheet 8 gives the following readings: Switch S1 was maintained closed for 2 hours and 21 minutes after start of the recording as indicated by a starting mark M1, and a magnetic mark was recorded every minute during that period. This indicates that the person under observation sat on his chair during this period of time in order to attend to his duties. There are no magnetic marks recorded following mark M2, indicating the elapsed time of 2 hours and 21 minutes, being recorded, until magnetic marks are recorded again after the lapse of 10 minutes. This indicates that the person left his chair for some reason and did not return until after the lapse of 10 minutes. The record indicates further that he left his chair exactly three hours after starting of the recording and did not return to his chair for several hours.

Actually, starting mark M1 is not visible to the operator, but a reading of the exact time at which recording is started is obtained on time indicator 74, timetable T1 on drum 9, and starting time pointer 67*a*. Thus, the starting time can be recorded on magnetic sheet 8 by writing the information thereon when it is removed from drum 9.

Figure 19:
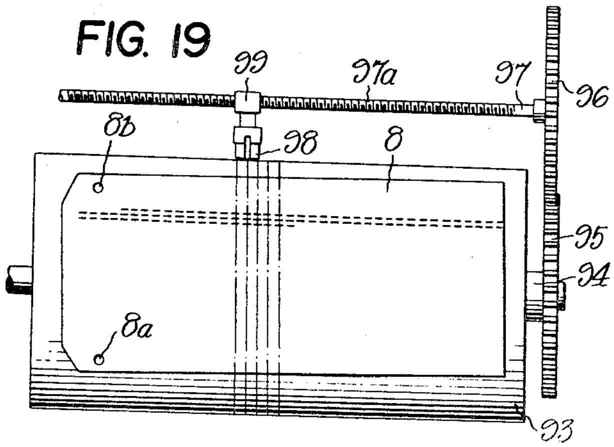
FIG. 19 is a somewhat schematic front elevation view illustrating means for reproducing information recorded on the magnetic recording sheet.

The information recorded on magnetic sheet 8 by a work sampler embodying the invention can, for example, be readout in a manner which will now be described. In FIG. 19, a gear 95 is secured to a shaft 94 of a drum 93, and meshes with a gear 96 supported by a shaft 97 formed with a threaded portion 97*a* with which there is engaged a support 99 of a reproducing head 98. Head 98 is so arranged that it bears lightly against the outer circumferential surface of drum 93, and moves a distance corresponding to one pitch of threaded portion 97*a* each time drum 93 makes one complete revolution. Magnetic sheet 8 is mounted on drum 93 so that it is positively positioned to bring vertical columns of magnetic marks, which are shown as horizontal rows of marks in FIG. 19, into alignment with the generating lines of drum 93. The positioning is effected by using positioning means prepared beforehand and which may comprise, for example, projections on drum 93 adapted to be received in the positioning opening 8*a* and 8*b* of magnetic sheet 8 to maintain sheet 8 in position.

With magnetic sheet 8 mounted on drum 93, drum 93 and head 98 are operated in synchronism with each other after head 98 is set at its starting position, so as to provide a reading of the magnetic marks. The locus or path of movement of head 98 on drum 93 is helical in shape, as shown by the dot-and-dash lines in FIG. 19, and indexes with the horizontal rows of magnetic marks. Thus reproducing head 98 provides readings of the magnetic marks along the horizontal rows while traversing the magnetic sheet across its width. Reproducing head 98 successively converts magnetic marks on sheet 8 into electric signal pulses which may be recorded, for example, on a sheet of recording paper to provide information which can be used immediately.

Figure 26:
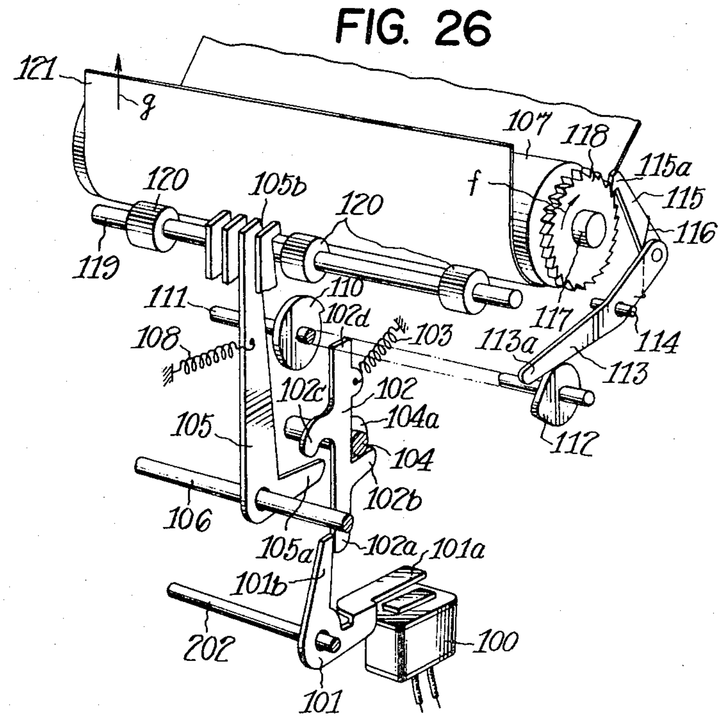
FIG. 26 is a fragmentary perspective view illustrating an information reproducing device.

Referring to FIG. 26, a bent arm 101*a* of a lever 101 is disposed in operative relation with an electromagnet 100 actuated by signal pulses from the reproducing head. Lever 101, which is loosely mounted on a shaft 102, has another arm 101*b* which is maintained in contact with a lower end 102*a* of an engaging and disengaging lever 102 by virtue of the weight of bent arm 101*a*. Lever 102 is biased upwardly and to the right by a spring 103, and is supported for pivotal movement about a shaft 104, with its arm 102*b* abutting shaft 104 and loosely supported on opposite sides of a flange 104*a* provided on shaft 104.

A finger 102*c* of lever 102 is disposed in facing relation with one arm 105*a* of a printing lever 105 which is loosely mounted on a shaft 106. The other arm of lever 105 is formed with a printing portion 105*b* facing a platen 107, and lever 105 is biased counterclockwise about shaft 106 by a spring 108, as also shown in FIG. 26. The arm of lever 105 carrying printing portion 105*b* is guided in a comb-shape guide member 109 (FIG. 27) and abuts against the inner end of a recess in comb 109.

An upper end 102*d* of lever 102 faces a cam 110 mounted on a shaft 111 which supports at one end thereof a cam 112 against which there presses one arm 113*a* of a lever 113. Lever 113, which is loosely mounted on shaft 114, has another arm to which a pawl member 115 is pivoted by a pin connection. Pawl member 115 has a pawl 115*a* at its free end and which is biased by a spring 116 to press against a ratchet 118 mounted on a shaft 117 which also mounts platen 107.

Figure 29:
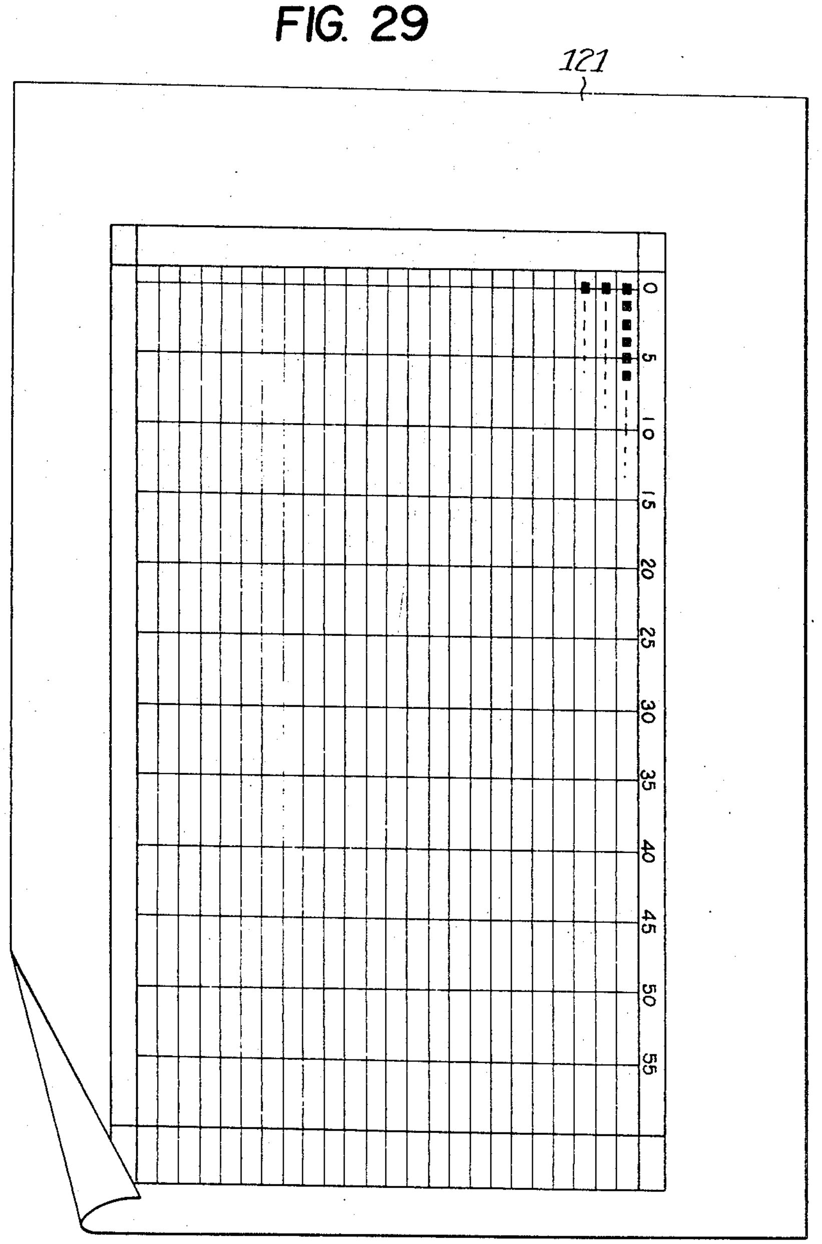
FIG. 29 is a plan view illustrating a sheet of recording paper for recording the reproduced information.

Rollers 120 on a rotatable shaft 119 press against platen 107, and a sheet of recording paper 121, such as the paper shown in FIG 29, for example, may be retained between platen 107 and rollers 120, with the paper being positioned correctly and its upper surface facing outwardly. Recording paper 121, which is arranged so that the time elapsed is recorded in hours along horizontal rows and in minutes along vertical columns, is inserted, with the lower end of the paper shown in FIG. 29 constituting a leading end, between platen 107 and rollers 120 from behind the platen through a suitable guide passage. The paper is then fully mounted on platen 107 by means of a feed device which has not been shown. A carbon tape or ribbon 122, as shown in FIG. 27, is disposed between the front surfaces of platen 107 and printing portion 105*b* of printing lever 105.

Figures 27, 28:
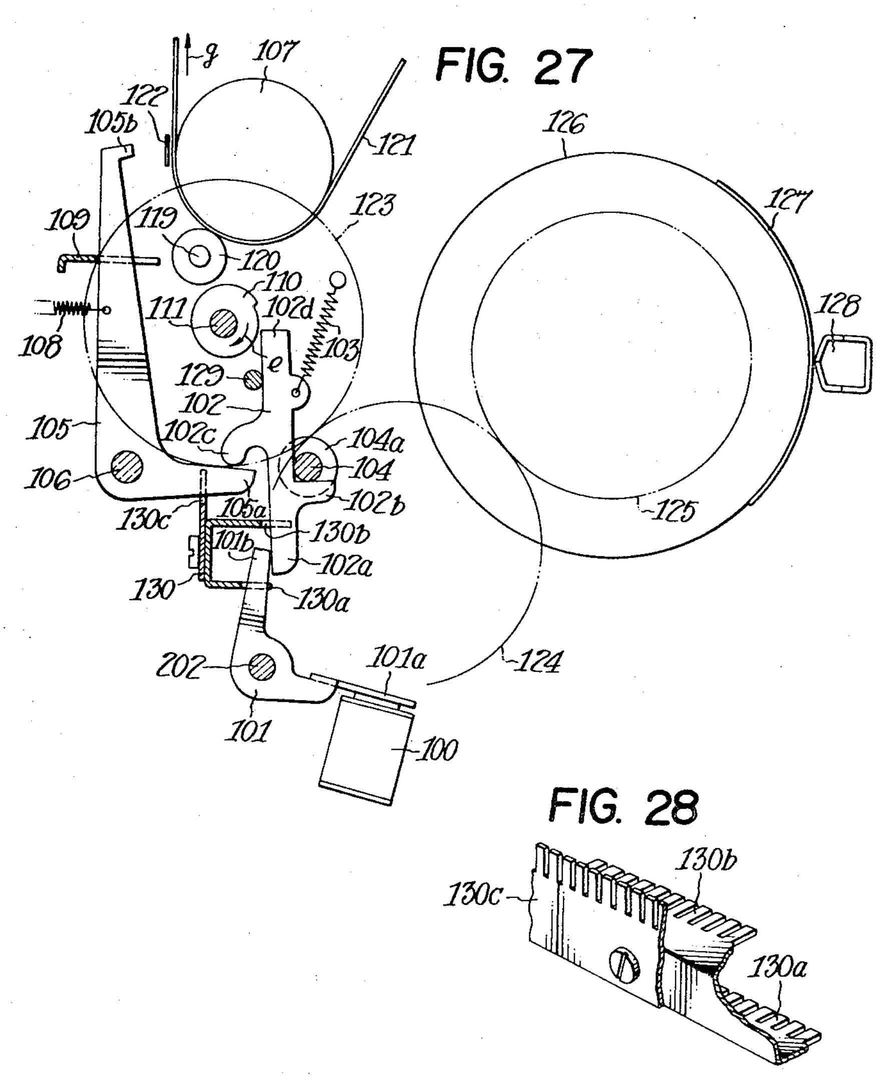
FIG. 27 is a side elevation view illustrating the reproducing device as it is actuated.
FIG. 28 is a fragmentary perspective view of a lever guide comb of the information reproducing device.

Shaft 111 carrying cam 110 is adapted to rotate in synchronism with a drum 126 of a reproducing device through the medium of a gear 123 secured to shaft 111, a gear 124 meshing with gear 123 and a gear 125 meshing with gear 124, all as shown in FIG. 27. A magnetic recording sheet 127 (corresponding to sheet 8) mounted on a drum 126 (corresponding to drum 93) has magnetic marks thereon read by a reproducing head 128 (corresponding to reproducing head 98) so as to convert the magnetic marks into electrical signal pulses. Signal pulses from head 126 are transmitted to electromagnet 100 for actuating the same, electromagnet 100 being deenergized in the absence of signal pulses being transmitted thereto.

While electromagnet 100 is in the inoperative or deenergized position, arm 101*a* of lever 101 is moved away from electromagnet 100 by virtue of the bias of spring 103 effective on lever 102. When arm 101*a* is away from electromagnet 100, the upper end 102*d* of lever 102 is retracted from cam 110. If electromagnet 100 is energized, arm 101*a* of lever 101 is attracted thereto so that lever 101 engages and moves, with its arm 101*b*, lever 102 in a counterclockwise direction about shaft 104 in FIG. 27, with the result that the upper end 102*d* of lever 102 is brought into engagement with the periphery of cam 110.

Cam 110 is adapted to make one complete revolution in the direction of arrow *e*, of FIG. 27, every time drum 126 makes one complete revolution. If lever 102 is brought into engagement with cam 110, then cam 110 causes lever 102 to move downwardly by engaging the upper end 102*d* of lever 102 while during rotation of cam 110. Lever 102 moves downwardly along a guide pin 129 and its finger 102*c* depresses arm 105*a* of printing lever 105. When depressed by lever 102, printing lever 105 pivots clockwise about shaft 106, in FIG. 27, causing its printing portion 105*b* to strike against carbon tape or ribbon 122 on recording paper 121 thereby to print a mark on the paper. This completes the printing of one bit of information.

Drum 126 and cam 110 are rotated at high speeds, for example, at a rate of two revolutions per second. Accordingly, downward movement of lever 102 takes place momentarily, and the printing operation is performed at a considerably high rate by printing lever 105. If lever 102 is released from engagement with cam 110, lever 102 is biased by spring 103 to return to its original position, and lever 105 is also restored to its original position in slaved relation.

If magnetic recording sheet 127 is similar to sheet 8, and if reproducing head 128 and drum 126 are similar to reproducing head 98 and drum 93, then the reproducing head 128 gives readings of horizontal rows of magnetic marks corresponding to the 24 hours elapsed when drum 126 makes one complete revolution. Accordingly, there are provided sets of 24 electromagnets 100, 24 levers 101, 24 levers 102, 24 levers 105 and 24 cams 110, so that 24 marks may be printed on the recording paper while cam shaft 111 makes one complete revolution.

When this is the case, the 24 cams 110 are arranged so that their projections are displaced angularly from each other, so that the printing lever 105 corresponding to a magnetic mark may be able to print a mark on the recording paper while the particular magnetic mark is readout. When one horizontal row of marks has been readout, lever 113 is pivoted by cam 112 (see FIG. 26) so that pawl 115*a* of member 115 causes ratchet 118 to rotate in the direction of arrow *f* a distance corresponding to the spacing between two adjacent ratchet teeth. Angular displacement of ratchet 118 by such a distance causes platen 107 to be similarly angularly displaced, thereby shifting recording paper 121 in the direction of arrow *g* in FIG. 27. As a result, recording paper 121 is shifted by one row, thereby permitting printing of the next horizontal row of marks by the printing portion of each printing lever 105. The magnetic marks on the magnetic recording sheet are readout as described, and all the magnetic marks are rendered visible, as shown in FIG. 29, by repeating this cycle of operation.

FIG. 28 illustrates the comb guide 130 for assuring correct operation of levers 101, 102 and lever 105. As shown, comb guide 130 comprises comb-tooth portions 130*a*, 130*b* and 130*c*. As shown in FIG. 27, levers 101, levers 102 and levers 105 have their arms guided by the respective combtooth portions 130*a*, 130*b* and 130*c*. When this is the case, shaft 104 is provided with a number of flanges 104*a* equal to the number of levers 102 for holding these levers.

From the foregoing description, it will be appreciated that a work sampler embodying the invention permits detecting a change in the physical state and conversion of such change into information expressed by "yes" or "no" to a given proposition and recorded magnetically. Recorded information can be rendered visible by means of a record reproducing device and used as information which can be effectively utilized. The work sampler of the invention plays an important role in a work sampling system, and is constructed most efficiently.

While specific embodiments of the invention have been shown and described in detail to illustrate the application of the principles of the invention, it will be understood that the invention may be embodied otherwise without departing from such principles.

What is claimed is:

1. In a work sampling system, a work sampler comprising, in combination, a rotatably mounted drum arranged to mount a magnetic recording sheet; ratchet and pawl mechanism operable to step said drum angularly in one direction; a rotatable cam operating said ratchet and pawl mechanism to step said drum angularly at preset time intervals; spring-driven clock mechanism rotating said cam at a regulated rate; a magnetic head cooperable with a magnetic recording sheet mounted on said drum to record information on the sheet; means operable by said clock mechanism and connected to said head to shift said head axially of said drum in coordination with said stepping of said drum; a self-contained source of electric potential; electrically energized means operable to rewind the spring of said clock mechanism; means operable by said clock mechanism to connect said electrically energized means periodically to said source of electric potential; a magnetic recording circuit arranged for connection to said magnetic head and including energy storage capacitor means; a switch in said circuit controlling energization of said circuit by said source of potential in accordance with changes in a physical state to be recorded; and a second switch connected to said storage capacitor means and having a first position connecting said storage capacitor means to said source of potential through said first-mentioned switch, and a second position connecting said storage capacitor means across said magnetic head; said rotatable cam operating said second switch, once during each unit time interval to a second position connecting said storage capacitor means across said magnetic head; whereby, whenever said first-mentioned switch is closed and said second switch is in its first position said storage capacitor means is charged, and said magnetic head is energized responsive to movement of said second switch by said rotatable cam to its second position to record magnetically an information bit on the recording sheet mounted on said drum during the associated unit time interval.

2. In a work sampling system, a work sampler, as claimed in claim 1, including a hollow cylinder rotatably and coaxially mounting said drum; said cylinder being constructed and arranged to receive and support a dry cell constituting said source of potential, and being provided with electric terminals cooperable with the electric terminals of a dry cell mounted in said cylinder and supported thereby.

3. In a work sampling system, a work sampler, as claimed in claim 1, in which said ratchet and pawl mechanism comprises a ratchet secured coaxially to said drum; a lever pivotally mounted intermediate its ends and carrying a pawl pivotally connected to one end and engaged with said ratchet; the other end of said lever being in operating association with said second switch; and a roller on said lever engaged with said rotatable cam for oscillation of said lever by said rotatable cam.

4. In a work sampling system, a work sampler, as claimed in claim 1, in which said storage capacitor means comprises two capacitors charged by closure of said first mentioned switch with said second switch in its first position, and connected in series across said magnetic recording head when said second switch is moved to its second position by said cam to increase the voltage applied across said magnetic recording head by discharge of said two capacitors.

5. In a work sampling system, a work sampler, as claimed in claim 1, in which each magnetic recording sheet is provided with a pair of holes adjacent one end thereof; said drum having a pair of finger means mounted thereon for pressing a magnetic recording sheet against the outer surface of said drum; respective pin means each disposed adjacent a finger means and arranged to engage in the holes of a magnetic recording sheet positioned beneath said finger means; and means mounting said pin means for retraction inwardly of the surface of said drum for feeding of a magnetic recording sheet beneath said finger means.

6. In a work sampling system, a work sampler, as claimed in claim 1, in which said magnetic recording circuit includes a receptacle in said work sampler and externally accessible; a plug releasable engageable in said receptacle; and a pair of conductors connecting said first-mentioned switch to said plug.

7. In a work sampling system, a work sampler, as claimed in claim 1, in which said drum is formed with a series of serrations extending axially thereof and aligned in a row extending circumferentially of said drum; a pivoted click-stop lever selectively engageable with said serrations to latch said drum in a selected position; a main control switch connected in series with said first-named switch and controlling connection of said first-named switch to said source of electric potential; an operator for said main control switch; and a pivoted lever engageable with said operator and operable, responsive to opening of said main control switch, to latch said click-stop lever in engagement with a serration of said drum; said pivotal lever, responsive to closing of said main control switch, releasing said click-stop lever for rotation of said drum.

8. In a work sampling system, as claimed in claim 1, a device for reproducing information recorded on a magnetic recording sheet mounted on said drum by said magnetic head; said device comprising a rotatably mounted reproducing drum arranged to have the magnetic recording sheet mounted thereon; means for rotating said reproducing drum; a magnetic reproducing head; means mounting said reproducing head for movement axially of said reproducing drum as said reproducing drum is rotated to scan magnetic information on a magnetic recording sheet mounted on said reproducing drum; and converter means connected to said magnetic reproducing head and operable to convert the magnetically recorded information into corresponding visible information.

9. In a work sampling system, a work sampler, as claimed in claim 1, including said rachet and pawl mechanism being operable by said clock mechanism to step said drum angularly once each minute through an angular distance of 6°, whereby said drum makes one complete rotation in 1 hour; a minute indicating scale extending circumferentially of said drum; and a fixed indicator cooperable with said scale to indicate the starting time of said drum and the elapsed time of rotation thereof.

10. In a work sampling system, a work sampler, as claimed in claim 9, including a rotatably mounted threaded shaft; driving means interconnecting said shaft and said drum and rotating said shaft at the same angular velocity as said drum; an engaging member engaged with the threads of said shaft for movement axially of said shaft; a mounting member mounted for movement parallel to said shaft and connected to said engaging member, said magnetic head being mounted on said mounting member; each complete rotation of said drum advancing said magnetic head to the distance of one pitch of the thread of said threaded shaft; an hours scale extending along said threaded shaft and indicating 24 hours; and a pointer on said mounting member cooperable with said hours scale.

* * * * *